US012085041B2

(12) United States Patent
Crowley

(10) Patent No.: US 12,085,041 B2
(45) Date of Patent: Sep. 10, 2024

(54) NEAR ISOTHERMAL MACHINE

(71) Applicant: ISOTHERMAL LIMITED, Gloucestershire (GB)

(72) Inventor: Michael Crowley, Gloucestershire (GB)

(73) Assignee: ISOTHERMAL LIMITED, Gloucestershire (GB)

( * ) Notice: Subject to any disclaimer, the term of this patent is extended or adjusted under 35 U.S.C. 154(b) by 0 days.

(21) Appl. No.: 18/262,396

(22) PCT Filed: Jan. 11, 2022

(86) PCT No.: PCT/GB2022/050046
§ 371 (c)(1),
(2) Date: Jul. 21, 2023

(87) PCT Pub. No.: WO2022/162341
PCT Pub. Date: Aug. 4, 2022

(65) Prior Publication Data

US 2024/0102430 A1 Mar. 28, 2024

(30) Foreign Application Priority Data

Jan. 26, 2021 (GB) .................................... 2101036

(51) Int. Cl.
*F02G 1/044* (2006.01)
*F02G 1/047* (2006.01)
*F02G 1/053* (2006.01)

(52) U.S. Cl.
CPC ............. *F02G 1/044* (2013.01); *F02G 1/047* (2013.01); *F02G 1/0535* (2013.01)

(58) Field of Classification Search
CPC .......... F02G 1/043; F02G 1/044; F02G 1/053; F02G 2270/40; F04B 37/10
See application file for complete search history.

(56) References Cited

U.S. PATENT DOCUMENTS

| | | | |
|---|---|---|---|
| 2011/0239640 | A1 | 10/2011 | Charlat |
| 2018/0142681 | A1 | 5/2018 | Crowley |

FOREIGN PATENT DOCUMENTS

| | | | |
|---|---|---|---|
| CN | 203420852 | U | 2/2014 |
| DE | 10319806 | A1 | 4/2005 |
| FR | 2959282 | A1 | 10/2011 |

(Continued)

OTHER PUBLICATIONS

International Preliminary Report on Patentability dated Jul. 31, 2023 issued in PCT International Patent Application No. PCT/GB2022/050046, 12 pp.

(Continued)

*Primary Examiner* — Jonathan R Matthias
(74) *Attorney, Agent, or Firm* — NIXON & VANDERHYE P.C.

(57) ABSTRACT

A near isothermal machine for compressing or expanding gas having a piston in a main cylinder with a heat absorbing and releasing structure attached thereto. The main cylinder contains a substantially constant volume of liquid maintained at a substantially constant temperature and a variable volume of gas, the gas temperature being controlled to substantially the same temperature as the liquid by the movement with the piston of the heat absorbing and releasing structure. A compensator is provided to compensate for variations in the level of liquid as the piston moves in the main cylinder.

19 Claims, 7 Drawing Sheets

(56) References Cited

FOREIGN PATENT DOCUMENTS

| | | |
|---|---|---|
| GB | 2553987 A | 3/2018 |
| GB | 2553987 B | 12/2020 |

OTHER PUBLICATIONS

International Search Report for PCT/GB2022/050046 mailed Apr. 8, 2022, 6 pages.

Written Opinion of the ISA for PCT/GB2022/050046, mailed Apr. 8, 2022, 11 pages.

International Preliminary Report on Patentability for PCT/GB2022/050046 mailed Apr. 8, 2022, with English Translation, 19 pages.

Fig 2A
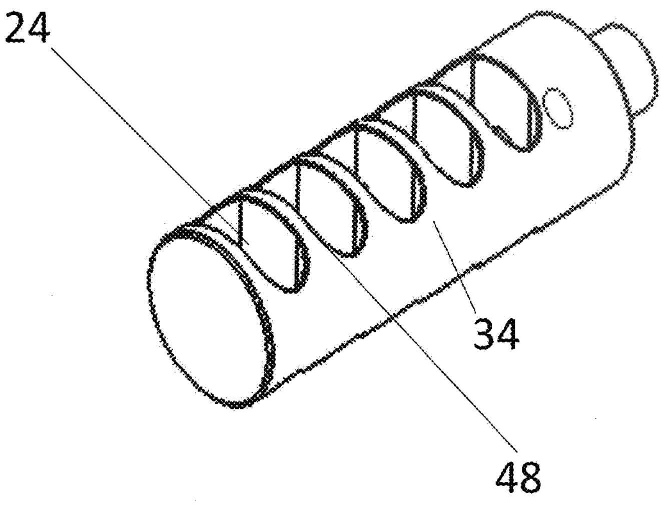
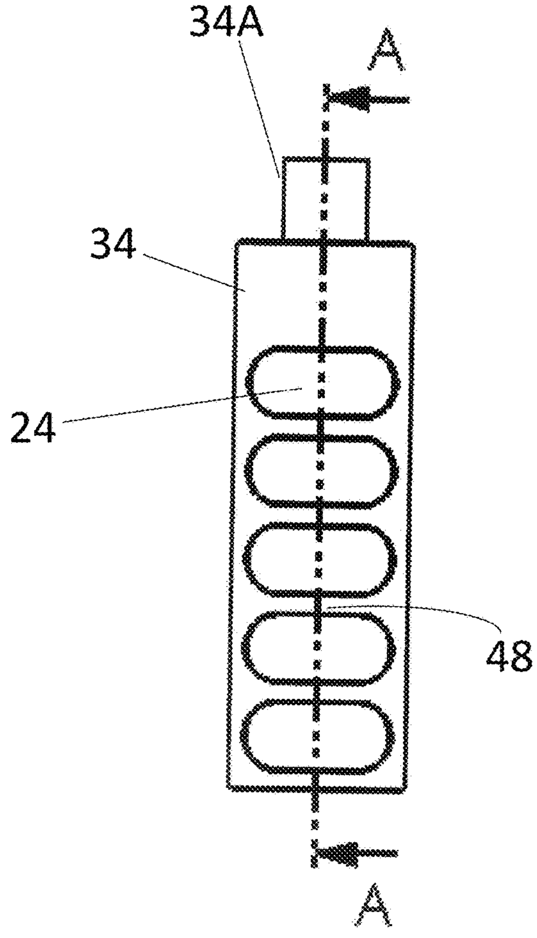
Fig.2B
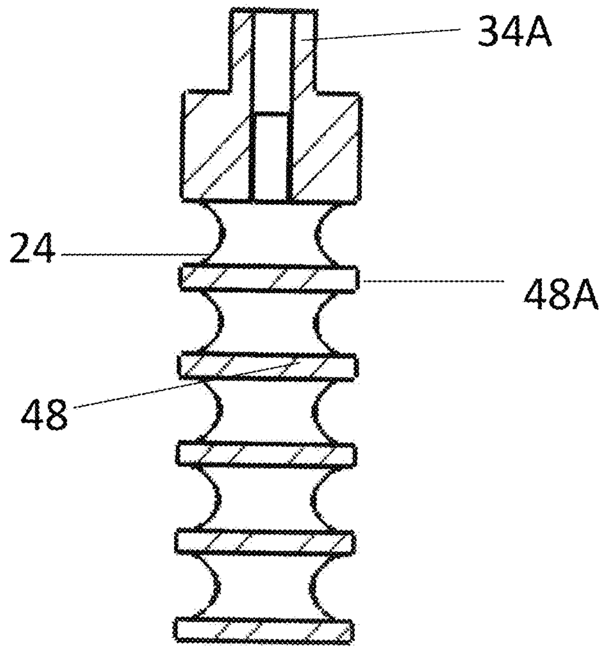
Fig.2C

NEAR ISOTHERMAL MACHINE

This application is the U.S. national phase of International Application No. PCT/GB2022/050046 filed Jan. 11, 2022, which designated the U.S. and claims priority to GB 2101036.8 filed Jan. 26, 2021, the entire contents of which are hereby incorporated by reference.

TECHNICAL FIELD

This invention relates to a machine for the near isothermal compression and expansion of gases using a piston and cylinder with a heat absorbing and releasing structure attached to a piston. The heat absorbing and releasing structure captures the heat of compression during gas compression or releases heat during gas expansion. The heat absorbing and releasing structure then transfers heat with a liquid just below the gas in the bottom of the cylinder. An external heat transfer circuit is then used to stabilise the liquid temperature in the bottom of the cylinder.

BACKGROUND ART

In GB2553987A the heat absorbing and releasing structure comprises bent fins fixed to the base of a cylinder. The fins move in and out of the liquid. Fixed baffles in the bottom of the cylinder can be used to reduce the amount of liquid splashing and so help stabilize the liquid. A stable liquid is required to prevent gas liquid mixing and stop the potential for liquid being carried with the gas stream leaving the cylinder.

While baffles in GB2553987B help stabilise the liquid and reduce splashing, their effectiveness is limited at increasing speeds.

Due to surface tension and liquid viscosity, a layer of liquid adheres to the fins as they are moved in and out. Not all the liquid adhering to the fins remains attached, some of the liquid falls away from the fins as liquid droplets. This is particularly the case with increasing speed as the higher acceleration forces applied to the fins encourages the liquid layer to separate from the fins.

As the fins move in and out of the liquid, the liquid is displaced by the fin volume, so the liquid surface level moves in the opposite direction to the fins. By design the fins are thin to limit this effect, however as there is a film of liquid attached to both sides of the fin, this increases the apparent thickness of the fins. This increase in apparent thickness can often be as much as 2 or 3 times the fin thickness dependent on liquid viscosity (fins are typically 0.15 mm thick). The liquid surface displacement is typically 5 to 20% of the piston displacement. With increasing speeds, the liquid surface will experience increasing acceleration forces. Once the peak liquid acceleration approaches or exceeds the gravitational acceleration (9.81 m/s2) the liquid will separate, as the gravitational acceleration is not sufficient to return the liquid as fast as the liquid is being moved by the withdrawing fins. During these periods of high negative acceleration, the effective gravitational field in the liquid is reversed so that gas then migrates below the liquid surface for part of the cycle. Once this occurs the gas and liquid will mix and form a foam in the bottom of the cylinder and further liquid loss to the exported gas is likely to occur. For example, if the liquid displacement is only 5 mm and the speed is 10 Hz then the peak negative acceleration exceeds the gravitational acceleration for part of the cycle.

As the fins move downwards into the liquid, in addition to the liquid acceleration effect described above, it is likely that small gas bubbles will be drawn down due to viscosity and surface tension effects at the gas/liquid interface.

Gas/liquid mixing in the bottom of the cylinder is detrimental to the operation of the near isothermal technology because:

Firstly, it raises the liquid level in the bottom of the cylinder; the raised liquid will probably be exported with the gas which is undesirable.

Secondly, the foaming liquid at the bottom of the cylinder is compressible; This reduces the maximum pressure ratio of the machine so reducing the systems effectiveness and power density.

Thirdly, a small amount of foam in the liquid, can lead to a runaway situation. As the gas is compressed and expanded the foam also expands and compresses in response to the changing pressure. This expansion and compression of the foam changes the foam volume. This then causes its own liquid accelerations which can generate more foam. This type of foaming problem is out of phase with liquid acceleration due to the fins being inserted and withdrawn. It is possible to start with one type of foaming issue which then causes a different runaway foaming problem.

GB2553987A also describes how heat can be transfer between the internal and external environment with a heat exchanger jacket wrapped around the cylinder or heat exchanger coils inside the cylinder. For this type of heat exchanger to be useful and efficient a large surface area (coils or jacket) is required. This heat exchanger area must be accommodated in or around the cylinder. If high power transfer is required, then larger heat exchangers are needed to make this possible. So, power density of this type of near isothermal machine is limited by the size of heat exchanger it can accommodate.

One further issue in some devices described in the prior art is maintenance of the liquid levels when there is liquid loss, for example, through leakage.

SUMMARY OF THE INVENTION

According to the present invention a machine for compressing or expanding gas which comprises:

a piston;

a vertical main cylinder or main cylinder inclined to the vertical;

a bush or seal inside the main cylinder through which the piston moves;

a heat absorbing and releasing structure comprising a plurality of fins attached to and disposed orthogonally to the bottom of the piston;

in which the piston moves downwards in a compression stroke with respect to the main cylinder and upwards with respect to the main cylinder in an expansion stroke, the main cylinder containing a substantially constant volume of liquid maintained at a substantially constant temperature and a variable volume of gas and which the gas temperature is controlled to substantially the same temperature as the liquid by the movement with the piston of the heat absorbing and releasing structure between the variable gas volume and the liquid;

wherein:

a connector rod is orthogonally attached to the base of the piston and to a compensator in a compensator chamber and mounted below the main cylinder, the compensator oscillating, in use, upwards into the main cylinder and downwards into a compensator chamber mounted below the main cylinder, the volume of the compensator entering the main cylinder on an upward movement at least partially compensating for the drop in liquid level in the main cylinder on an upward movement of the heat absorbing and releasing structure and the volume of the compensator leaving the main cylinder on a downward movement at least partially compensating for liquid level gain in the main cylinder on downward movement of the heat absorbing and releasing structure.

In one arrangement a bush or seal is provided between the main cylinder and the compensating chamber, the bush or seal having an aperture through which the compensator passes.

In one arrangement the compensator has pockets along its length, said pockets transporting liquid from the compensator chamber to the main cylinder during upward movement of the compensator, or from the main cylinder to the compensator chamber during downward movement of the compensator.

The pockets can be formed between pocket separators around the compensator. Ideally the pocket separators have cylindrical lands around their periphery the said lands being co-axial with the compensator. Where there is a bush or seal between the main cylinder and the compensating chamber. At least one land is opposite the bush or seal at any one time, minimising direct flow of liquid from the compensator chamber to the lower chamber.

An inlet port may be provided in the compensator chamber, through which liquid may be drawn in during upward movement of the compensator. An outlet would also be provided through which excess liquid may be expelled from the compensator chamber during downward movement of the compensator.

In a development of the invention, or as an independent feature, a machine for compressing or expanding gas comprising a piston, a vertical main cylinder or main cylinder inclined to the vertical, a heat absorbing and releasing structure comprising a plurality of fins attached to and disposed orthogonally to the bottom of the piston, in which the piston moves downwards in a compression stroke with respect to a main cylinder and upwards with respect to the main cylinder in an expansion stroke, the main cylinder containing a substantially constant volume of liquid maintained at a substantially constant temperature and a variable volume of gas, in which the gas temperature is controlled to substantially the same temperature as the liquid by the movement with the piston of the heat absorbing and releasing structure between the variable gas volume and the liquid and characterised in that the main cylinder is divided into an upper chamber and a lower chamber by a slotted plate, the slotted plate having slots therein through which the fins pass.

The slotted plate is mounted on a slotted plate assembly having a cylindrical wall facing the inner wall of the main cylinder. Support fins may be provided below the slotted plate, the fins forming the heat absorbing and releasing structure moving upwards and downwards between the support fins. A channel may be provided wholly or partially around the slotted plate between the slotted plate and the main cylinder wall. A control passage may be provided from the bottom of the channel towards the lower chamber. The control passage may be a narrow gap between the cylindrical wall of the slotted plate assembly and the inner wall of the main cylinder, a narrow passage in the cylindrical wall of the slotted plate assembly, or a separate duct. It has been found that use of a control passage restricts sloshing in the channel between the slotted plate assembly and the wall of the main cylinder as liquid inertia and friction developed in the control passage resists the flow. The use of a large channel reduces the sloshing amplitude.

In this embodiment, a port is normally provided in the main cylinder just below the top of the slotted plate. The port allowing liquid in the main cylinder above the port to leave the main cylinder.

The lower chamber may have a gas vent. Where slotted plate is part of a slotted plate assembly, the gas vent would normally be through the slotted plate.

Two machines according to the invention may be mounted together to form a near isothermal Stirling heat pump. In one arrangement the machines are driven with a 120° phase difference.

When compared to existing machines using a heat absorbing and releasing structure, reciprocating into and out of a liquid, the liquid stability in the bottom of the main cylinder is significantly improved. As a result, the isothermal efficiency and output from a machine of a given size are improved. Manufacturability of the heat absorbing and releasing structure is simplified so that the fins that make up the heat absorbing and releasing structure can be more closely spaced.

The invention improves the liquid level (volume) control in main cylinder. With better level control, the minimum ullage volume when the main cylinder is at bottom dead centre can be reduced. This can improve the pressure ratio of the machine and so the potential power density. Any small excess volumes of liquid drawn into the lower chamber can be ejected through the level control port.

BRIEF DESCRIPTION OF THE DRAWINGS

FIGS. 2A to 2C illustrate an alternative compensator structure to that shown in FIG. 1;

ILLUSTRATIVE EXAMPLES OF THE INVENTION

Figure 1:
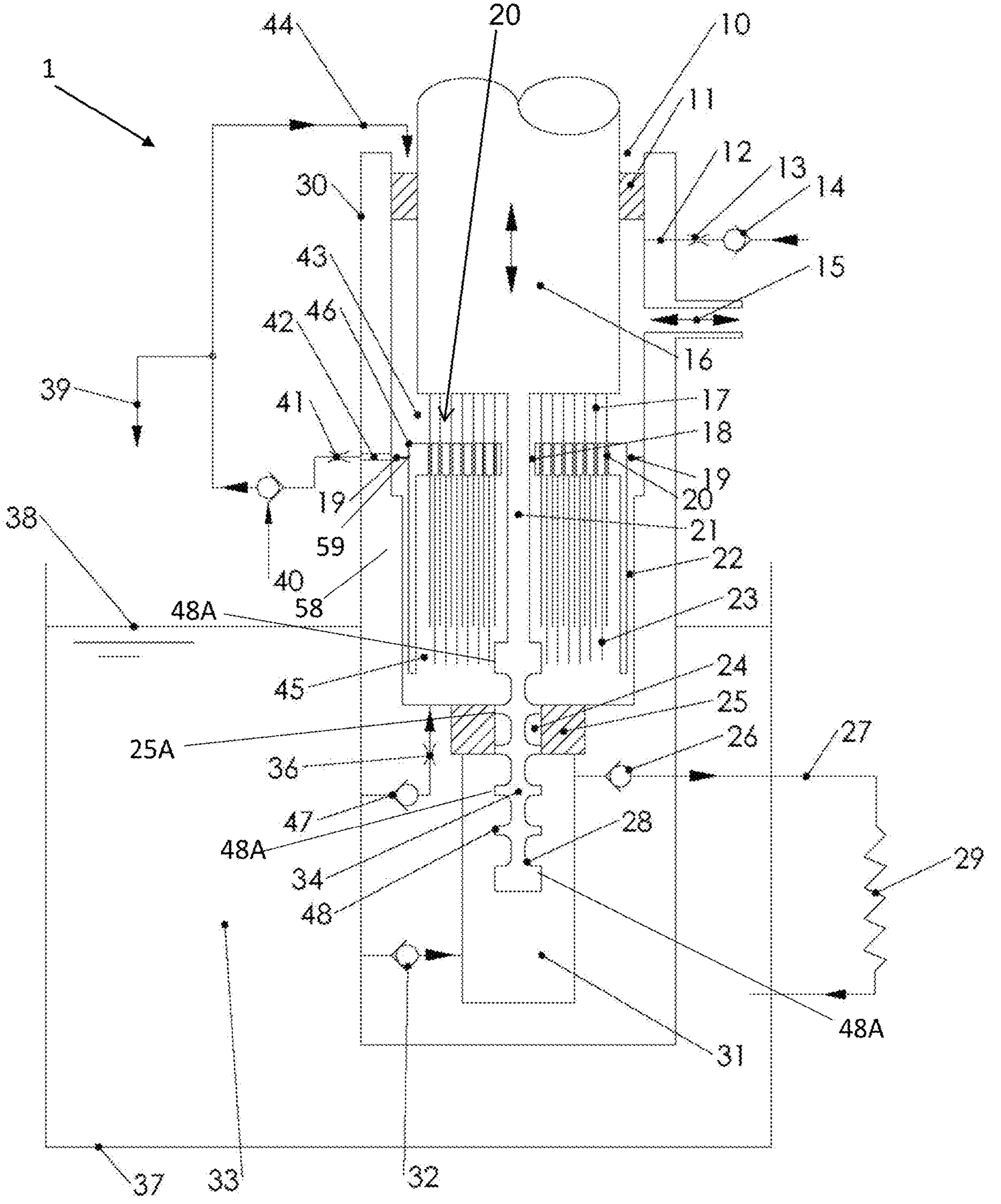
FIG. 1 shows a schematic vertical section of a near isothermal machine according to the invention illustrating the main features.

FIG. 1 shows a schematic vertical section of a near isothermal machine 1 according to the invention.

Figure 5:
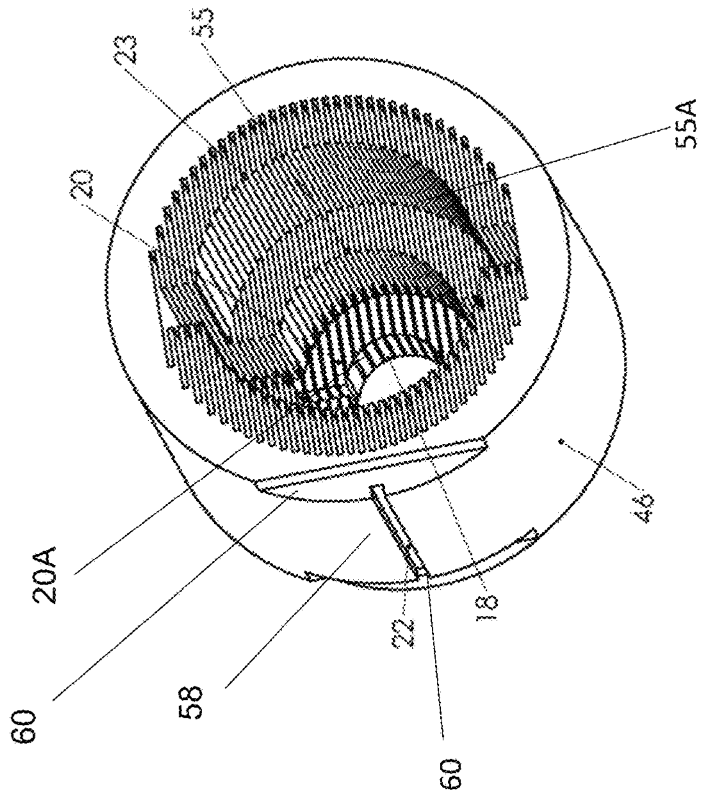
FIG. 5 is a perspective view of the bottom of the slotted plate assembly of the machines shown in FIGS. 1, 2 and 3.
Figure 4:
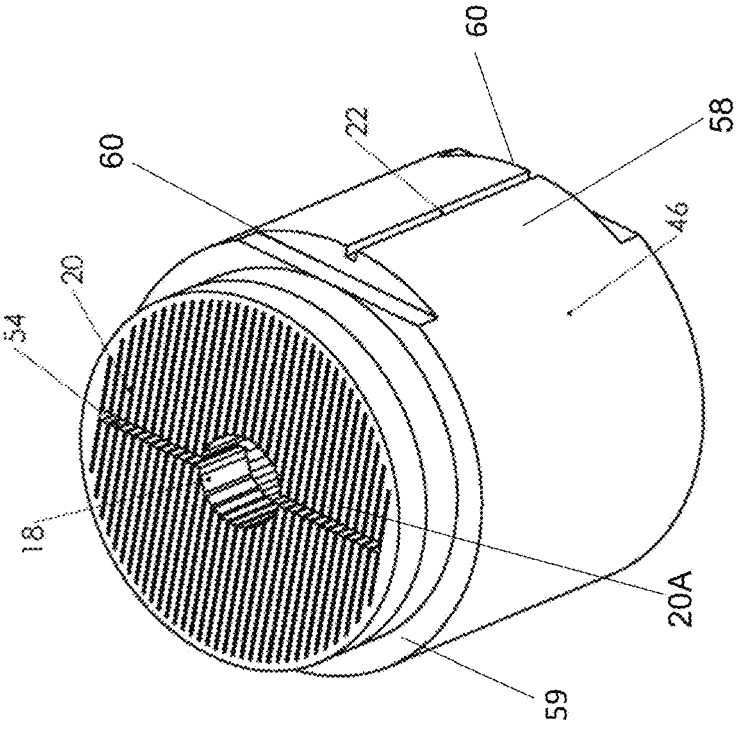
FIG. 4 is a perspective view of the top of the slotted plate assembly of the machines shown in FIGS. 1, 2 and 3.

A main piston 16 compresses or expands a gas in chamber 43 as it reciprocates in main cylinder 30. Attached to the bottom of the piston and extending orthogonally therefrom are a plurality of fins 17 which forms the heat absorbing and releasing structure of the machine. The fins 17 reciprocate in and out of slots 20A in a slotted plate 20 which is part of a slotted plate assembly 46. The slotted plate assembly 46 is cylindrical shape with the slotted plate 20 mounted at atop the slotted plate assembly 46 and with the cylindrical wall 58 of the assembly 46 extending down within the main cylinder 30 close to its inner wall. (FIGS. 4 and 5 show an illustrative slotted plate assembly 46 in greater detail). The bottom of the chamber 43 is filled with hydraulic liquid 19. The slotted plate assembly 46 is mostly submerged below the liquid level 19, however, the top face of the slotted plate 20 is just above the liquid level.

The gas is compressed or expanded between the piston 16, main cylinder 30 and liquid 19. As the gas is compressed or expanded it is mainly located between the fins 17. The fins 17 provides a large surface area for heat transfer such that the mean distance for heat transfer between the gas and the fins 17 is small. As the gas is compressed or expanded at speed, its temperature is held at substantially the same temperature as the fins and gas compression and expansion occurs at near isothermal conditions. The fins' temperature is stabilised by the liquid below it, into which the fins 17 are inserted into on every cylinder stroke. The liquid temperature itself stabilised by external heat transfer.

The present invention provides a method to compensate for the liquid displacement that occurs as the fins 17 are inserted and withdrawn from the liquid 19. This compensation system ensures the liquid level is maintained at near constant level. The larger volume of the working liquid is enclosed in a slotted plate assembly 46 which helps control the thickness of the liquid film that attaches to the fins. Compared to the prior art, the reduced thickness of the liquid film attached to the fins 17 in the upward stroke of the piston in this invention helps to reduce the amount of compensation required.

The main cylinder 30 has an upper chamber 43 and lower chamber 45 which are split from one another by the slotted plate 20. Hydraulic and gas links between the chambers are described below.

Liquid level compensation is provided by a compensator piston 34. The compensator piston 34 is rigidly connected to the main piston 16 via a connection rod 21. The compensator piston 34 always operates below the liquid level 19. The compensator piston 34 moves in and out of a compensator chamber 31 below the lower chamber 45 through an aperture 25A in a bush or seal 25, the bush or seal 25 sealing the bottom of the lower chamber 45 and separating it from the compensator chamber 31. The cross-sectional area of the compensator piston 34 or the bore of bush or seal 25 is approximately equal to the effective sectional area of fins 17 (that is the fin cross sectional area plus the cross-sectional area of the attached liquid film) plus the cross-sectional area of connecting rod 21 and the small film thickness attached to rod 21. As the reduced volume of liquid displaced by the fins and connecting rod is the same as the volume gained by the compensator piston 34 moving through the bush or seal 25 into the lower chamber 45, the liquid level remains constant.

Although a cylindrical bush or seal 25 is shown in the drawings mounted in the aperture 25A, the bush or seal can be mounted within a spherical bearing within aperture 25A, to allow for minor relative rotational movement of the compensator piston with respect to the aperture 25A.

The liquid film thickness attached to the fins is difficult to calculate because it depends on a number of factors, the most important ones being the width of slots 20A, liquid viscosity (which can vary with temperature) and operating speed. As a first order approximation, the total film thickness (both sides of the fins 17) is ½×(width of slot 20A–fin 17 thickness). This is reasonably correct calculation when slot widths are no more than 0.5 mm wider than the fin 17 thickness.

The film thickness attached to the connecting rod 21 is not very significant in calculating the optimal compensator 34 area because the surface area of the rod 21 is very small compared to the area of the fins 17 so this term can be excluded from the calculation without making much difference.

This calculation can be used for initial sizing of compensator 34 area. But the final area should be found or confirmed by testing.

The compensator 34 has optional openings 24 in its surface in the form of pockets between separators 48 along its length. The separators 48 have cylindrical lands 48A at their extremities, the lands being co-axial with the compensator 34. As the openings 24 move between chambers 45 and 31, they transfer liquid between the chambers and so mix the liquids between chambers 45 and 31. As the compensator 34 moves through bush or seal 25 at least one land 48A of a pocket separator 48 makes a hydraulic seal between chambers 45 and 31.

As the compensator 34 reciprocates it is subjected to acceleration forces which it in turn applies to the liquid in the openings 24. The acceleration forces on the liquid in the openings 24 makes it circulate with liquid outside the opening 24. This circulating flow can be encouraged by optional large radii 28 between the base and sides of the openings 24 or by scalloping. This circulating flow ensures effective transfer of the liquid in the openings 24 to the adjacent liquid.

The liquid mixing between chambers 31 and 45 also ensures rapid heat transfer between the chambers as good liquid mixing ensures the temperature in both chambers approach the same value. If the size of compensator 34 is not sufficient to provide the required heat transfer its cross-sectional area can be increased by increasing the size of the connecting rod 21. Normally rod 21 is sized to safely carry the loads between the main piston 16 and the compensator 34, but if needed its cross-sectional area can be increased to facilitate a larger compensator 34, so liquid mixing and heat transfer between the chambers can be increased.

The liquid in compensator chamber 31 is pumped through an external heat exchanger 29. As this is an external heat exchanger it can be any size needed to make the required heat transfer. It is not limited by the physical size of the near isothermal compressor or expander as in the machine of GB2553987A.

As the compensator 34 moves downwards into compensator chamber 31 it pumps liquid through check valve 26, then through the external heat exchanger 29 and back into a liquid container 37. When the compensator 34 moves upwards, liquid 33 is drawn into compensator chamber 31 via check valve 32. The pumping process then repeats. The preference is for the inlet port, (via check valve 32) to be towards the bottom of compensator chamber 31 and the outlet port (via check valve 26) to be towards the top. This arrangement helps with efficient heat transfer because as compensator 34 is moving downwards the flow in compensator chamber 31 is moving upwards, this helps sweep the liquid transferred from lower chamber 45 into compensator chamber 31 and then into the external heat exchanger circuit, and in the process ensuring fresh liquid from container 37 is moved into lower chamber 45 as quickly as possible.

There is a channel 59 wholly or partially around the slotted plate 20, between the slotted plate 20 and the inner wall of the main cylinder 30. For optimal performance of the near isothermal compressor or expander the liquid level needs to be maintained as close as possible to a predefined level 19, just below the top of the slotted plate assembly 46. The liquid level is set by the level control port 42 passing through the wall of the main cylinder from channel 59.

The level control system uses the pressure changes inside the main cylinder 30 relative to the external pressure to maintain the correct liquid level. The specific application of near isothermal compressor and expander will influence the relative pressure differences inside the main cylinder compared to the external pressure, so for different applications a slightly different approach is required.

If used in a Stirling cycle the mean internal pressure is approximately the same as the external pressure and the pressure difference will occur around this mean pressure. If used in a gas compressor, the mean internal pressure will be well above the external pressure and will only drop slightly below the external pressure on the suction inlet stroke.

The machine design is such that there is a small amount of net liquid 33 flow into the bottom of the lower chamber 45. The net inflow volume is typically between 0.01 and 1% of main cylinder displacement per cycle. This provides a slow continuous filling of the chamber. Once the liquid level reaches the control port 42 the excess liquid is expelled from the main cylinder.

FIG. 1 shows a configuration which would be used if the machine 1 was operating in a Stirling cycle. In FIG. 1 excess liquid from the port 42 passes through a restrictor 41 and check valve 40 back into container 37. The restrictor or orifice 41 is size so that the flow rate is slightly more than the net liquid inflow into the bottom of the main cylinder. Check valve 40 prevents reverse flow. If the invention is used in a gas compressor, an example arrangement is described below with reference to FIG. 3.

In a Stirling cycle (but not a gas compressor) when the liquid level is below port 42, on the compression stroke when the internal pressure is higher than the external pressure, gas is vented via restrictor 41 and check valve 40. Gas port 15 is connected via a regenerative heat exchanger 64 (see FIG. 6) to the main cylinder of another near isothermal gas compressor and expander, so some of the working gas is lost from the cycle, this reduces the mean pressure inside the main cylinders to a pressure lower than the external pressure. As the mean pressure is now lower than the external pressure there is a net gas leakage flow into the main cylinders. The gas leakage paths are between the piston 16 and bush or seal 11 and via optional restrictor 13 and optional check valve 14. The system should be designed so that when the liquid level is below control port 42 the mean pressure in the main cylinder is depressed but the amount is limited by the leakage of gas back into the main cylinder. Accurately controlling the gas leakage flow between the piston 16 and bush or seal 11 can be difficult. In many cases it is better to try and reduce the leakage between the piston 16 and bush or seal 11 as close to zero as possible and then use an alternative leakage flow path through restrictor 13 and port 12. Check valve 14 is optional to ensure the gas leak is only in one direction. However, there are risks in using check valve 14 because in some circumstances the net inflow of gas via port 12 may be too high so making the mean operating pressure inside the main cylinder increase and then the level control system will not work. Check valve 14 is not a preferred configuration. For a Stirling cycle, restrictor 13 only needs to be fitted to one of the main cylinders, or it could possibly be fitted anywhere in the connecting gas flow passages. It should be noted that bush or seal 11 acts also as a seal preventing the passage of liquid.

Schematic FIG. 1 shows two optional flow paths 39 or 44 from check valve 40. The gas and liquid output from the level control port can be fed directly back via 39 into container 38 but an advantageous alternative is to feed the gas liquid mixture via 44 into a small piston wetting pool 10 on top of the bush or seal 11, so that liquid pools in piston wetting pool 10. Any excess liquid simply overflows and drains back into the container 38. This pooled liquid wets the piston 16. It is much better for gas sealing and friction reduction for there to be a wetted piston bush or seal interface.

For the reasons explained above when the liquid level is below the level control port 42 the mean internal pressure is reduced. This reduced mean pressure causes a net leakage inflow of liquid into the bottom of the main cylinder. There are two potential paths for this leakage flow, either via an optional control restrictor 36 and optional check valve 47 (this is not the preferred option) or via the annular clearance gap between the lands 48A of the separators and the bush or seal 25. Unlike the gas seal between the piston 16 and its bush or seal 11, the liquid leakage between the compensator and its bush or seal are much easier to control because the liquid has much higher density and viscosity and the diameter of the compensator is smaller than the piston. Typically, the radial gap between the separator lands 48A and bush or seal 25 is about 0.05 to 0.1 mm.

The advantage of not using flow restrictor 36 is that it reduces the component count but if leakage flow needs to be increased it can be used with or without check valve 47.

When the liquid level is below level control port 42 the mean pressure inside the main cylinder is below the external pressure so there is a net liquid leakage flow into the main cylinder raising the liquid level (for part of the cycle the leakage is outwards, but the net flow is inwards). Once the liquid level covers the level control port 42, gas will no longer leave the main cylinder via this route. As gas is still leaking into the main cylinder (via restrictor 13 and between piston 16 and bush or seal 11), the mean pressure inside the main cylinder will slowly rise. The rising gas pressure will slowly reduce the net leakage flow of liquid into the main cylinder. This combined with liquid being pumped out via the level control port 42 will reverse the situation and the liquid level inside the main cylinder will start to drop. The process will then repeat keeping the liquid level at about the control port 42 level. When the liquid level is around the control port level 42, there is often a mixed gas liquid flow being expelled from port 42.

FIG. 1 shows check valve 40 below the level of outlets 39 or 44. It can be advantageous to trap some liquid at the check valve outlet, as this keeps the check valve seat wet. If the check valve is working dry it can be difficult to prevent reverse flow when working with gas only.

The preferred configuration is for two main cylinders in a Stirling cycle machine to have individual level control ports 42, restrictors 41 and check valve 40. When the liquid level in one main cylinder reaches control port 42, it stops ejecting gas, but gas is still being ejected at the other main cylinder so there is still a reduction in mean pressure but not as much as when both main cylinders were ejecting gas. This situation will continue until the level in the second main cylinder catches up. Generally, both main cylinders will have the same restrictor and liquid leakage rates so their liquid levels will closely match. Tests have shown this works very well.

Figure 7:
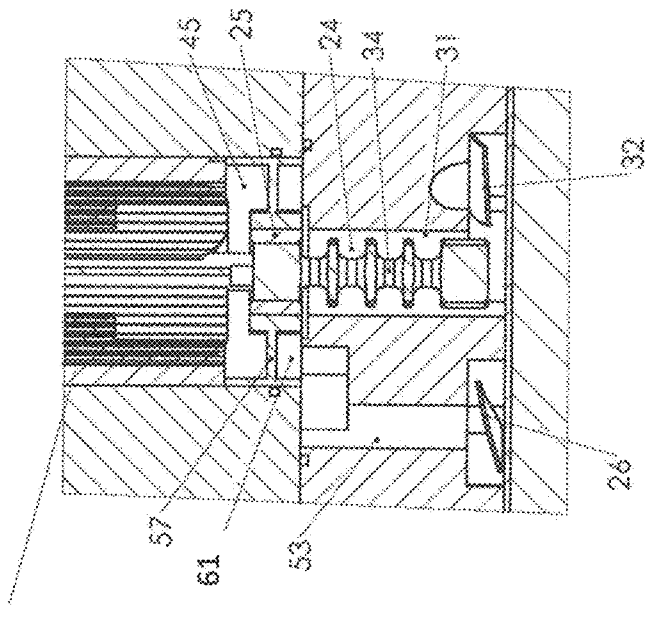
FIG. 7 shows a detailed section view of the external flow circulation system of the near isothermal Sterling heat pump of FIG. 6.

An alternative is to link the two liquid chambers 45 of a Stirling machine together in a similar way to that shown in FIG. 7 of GB2553987B. Then both main cylinders have the same liquid level and a single level control port 42 can be used to control the levels in both main cylinders.

When a machine of FIG. 1 system is stopped, the level in lower chamber 45 will gradually drop to the external level 38 in container 37 because of the designed leakage flow. To ensure the machine primes when the machine is started, the liquid level 38 needs to be at or above the level of bush or seal 25 but lower than port 42 to avoid overfilling the upper chamber 43. Overfilling upper chamber 43 could create a hydraulic lock preventing piston 16 moving to its bottom dead centre position which may be catastrophic.

In normal operation the liquid transferred between chambers 45 and 31 via the openings 24 in the compensator does not results in a net transfer of liquid. But when the level is low there can be significant splashing in lower chamber 45 with some gas being transferred via the openings 24 into chamber 31. Some of this transferred gas is then vented through the heat transfer circuit 27 and heat exchanger 29. Thus, when the internal liquid level is low the compensator 34 can help with initial priming. As the main priming process relies on a small liquid leakage flow it may take some minutes for the machine to prime fully.

In FIG. 2, rather than the openings 24 being pockets, they are in the form of slots, flat top and bottom and rounded at their sides, which pass diametrically through the compensator 34. Separators 48 separate the slots. The separators 48 have cylindrical lands 48A, the lands 48A being co-axial with the compensator 34. As the openings 24 move between chambers 45 and 31, they transfer liquid between the chambers and so mix the liquids between chambers 45 and 31. As the compensator 34 moves through bush or seal 25 at least one land 48A of a separator 48 makes a hydraulic seal between chambers 45 and 31. At the top of the compensator 34A is a threaded aperture 34B into which a thread extending from the end of connecting rod 21 is fitted.

Figure 3:
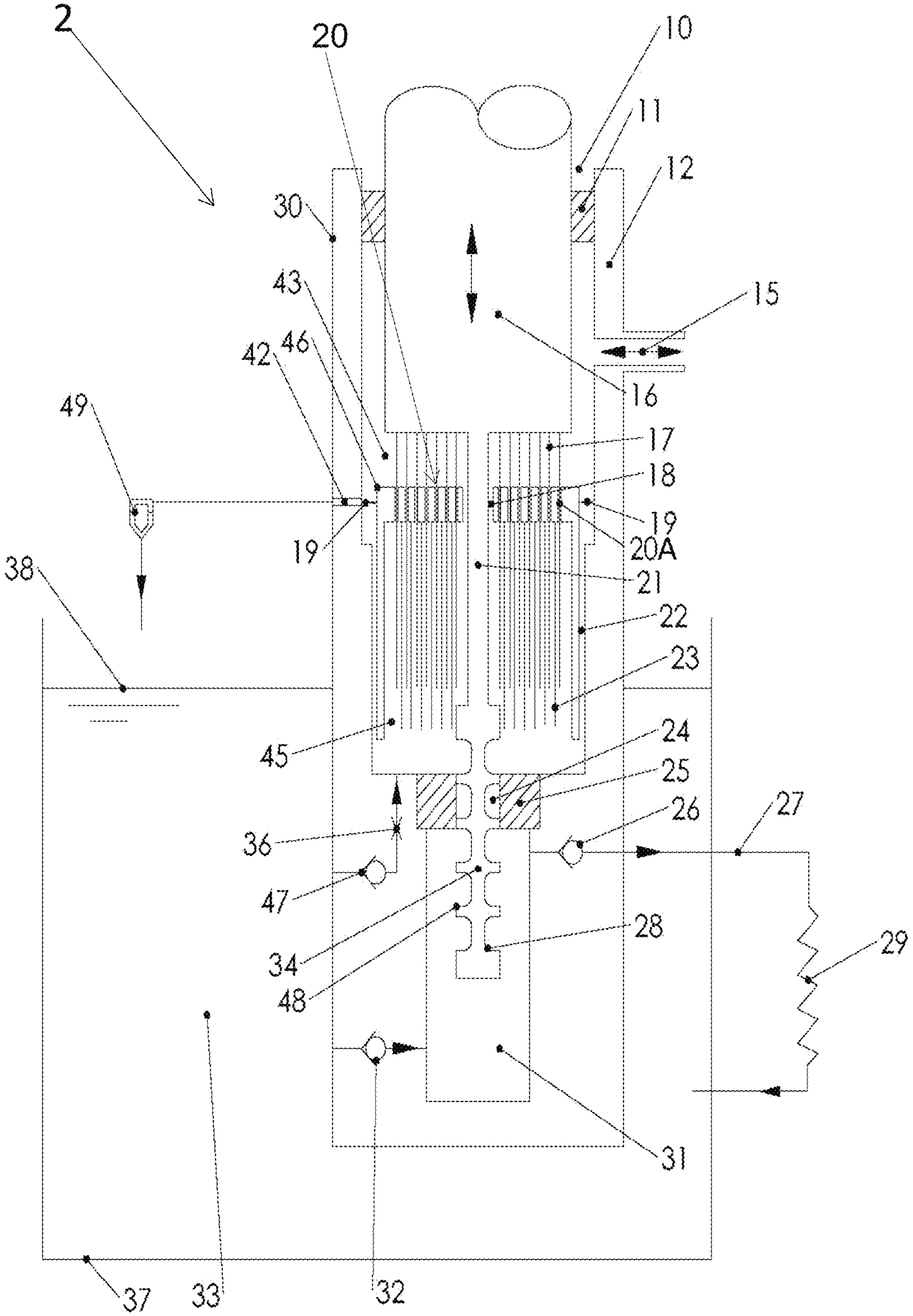
FIG. 3 shows schematically an alternative level control arrangement for a gas compressor to that shown in FIG. 1.

For a gas compressor the mean pressure inside the upper chamber 43 will be greater than the external pressure so a different approach to level control is required. FIG. 3 shows the preferred arrangement for a gas compressor. The gas compressor 2 differs from the structure in FIG. 1 in that the restrictor 13 and check valve 14 are removed. Gas leakage between piston 16 and bush or seal 11 should be reduced as far as practical. Any radial gap between the separators 48 and bush or seal 25 should also be reduced as far as practical to reduce liquid leakage across the lands 48A.

The pressure in upper chamber 43 will be below the external pressure during the gas suction stroke, as piston 16 moves upwards. During the suction stroke some liquid is drawn into lower chamber 45 via check valve 47 and restrictor 36. In this case check valve 47 is required to stop reverse flow on the compression stroke.

The level control is still via port 42 but in this application, it does not vent any gas. When the liquid level is at or above the level control port 42 the liquid flows into float vent valve 49. When there is sufficient liquid volume in the float vent chamber the float lifts and allows excess liquid to flow back into container 37.

An alternative to the float vent valve 49 could be a level sensor, such that when a predefined level is reached a control valve is opened which allows flow to drain back into container 37.

Part of the slotted plate assembly's 46 function is to control the thickness of the liquid film attached to the fins; it also ensures liquid stability in the bottom of the main cylinder. Without the slotted plate assembly 46, liquid splashing and gas liquid mixing would occur as the speed increases. Ultimately, liquid is transferred with the gas through port 15. Once liquid transfer starts the isothermal compressor or expander is not working effectively. The slotted plate assembly 46 improves the liquid stability significantly over the interleaved baffles shown in GB2553987A.

The slotted plate assembly 46 can also be used to support and guide the fins 17 allowing the fins to be flat rather than the arcuate or bent fins in GB2553987A used to improve structural stability, flat fins being prone to bending.

Figure 6:
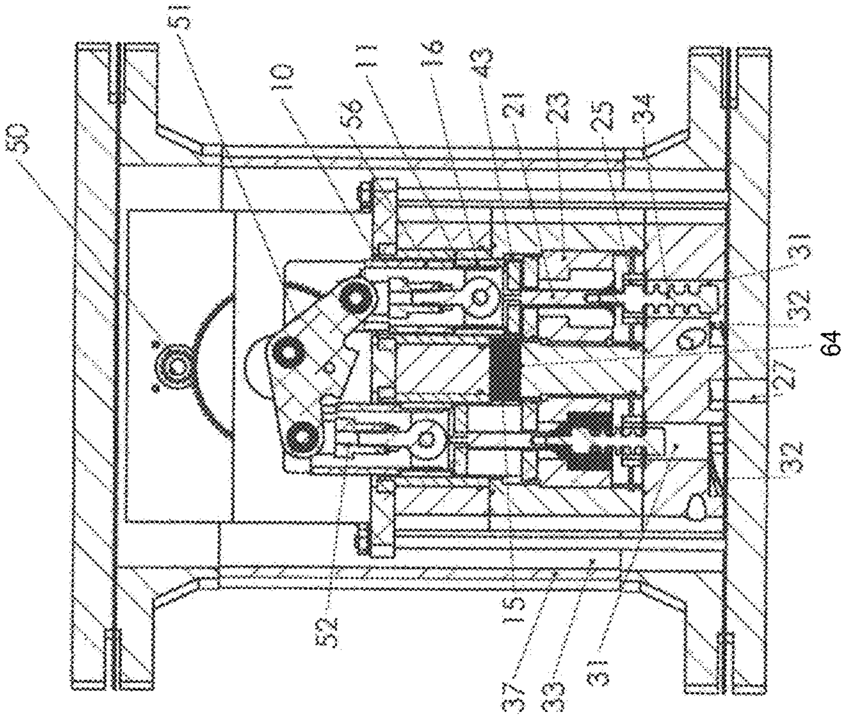
FIG. 6 shows an example of the invention used in a near isothermal Stirling heat pump.

FIGS. 4 and 5 show the slotted plates assembly 46 used in the machines of FIGS. 1, 2 and 3 and the Stirling cycle machine of FIG. 6. These parts can be made by 3D printing or by machining including the use of wire erosion or electrical discharge machining.

The slots 20A are sized to accommodate the fins 17 so that they can move up and down freely through the slots without friction. There is a central hole 18 to accommodate the connection rod 21. The widths of slots 20A need to be sized to accommodate any tolerancing issues that may arise during manufacture. In the figures the slots 20A are shown as straight to accommodate flat fins, but they could be curved. With curved slots and fins, getting accurate tolerance control between the fins and slots is more difficult, so the slot width may need to increase to accommodate this tolerance issue, this is not advantageous.

Typically, the slot width for a flat fin 17 needs to be about 0.1 to 0.5 mm bigger than the fin thickness. The narrower the slot can be made without inducing any friction the more advantageous it is.

As the fins 17 move upwards out of the liquid 19, the fins are wet with a surface layer of liquid. The thickness of this surface layer is limited by slot width, obviously the smaller the slot width the thinner the surface layer. As it is not possible to be assured that each fin 17 is central in the slot the liquid layer may be thicker on one side compared to the other.

The less liquid that is attached to the fins as it moves out of the liquid the less likely it is to separate from the fin due to the acceleration forces, as piston 16 rapidly moves up and down. If liquid separates it is likely to form liquid droplets which can be carried out with the gas at port 15, this is very undesirable.

When the fins 17 moves downwards most of the liquid attached to the fins goes back through the slots into lower chamber 45. However, some of the liquid may be removed or scraped off the fin as it moves down. A chamfer or radius lead into the slots may help reduce the amount of liquid removed as the fins are reinserted into lower chamber 45. The liquid removed during reinsertion will initially sit on top of the slotted plate assembly 46 and it then drains into the channel 59 between the main cylinder 30 and the slotted plate assembly. From here the liquid then drains back through passage 22 between the cylindrical wall of the slotted plate assembly and the wall of the main cylinder 30 to the bottom of lower chamber 45.

There can be a small difference between the volume of liquid drawn out of chamber 35 as the fins are extracted compared to the amount returned when the fins are reinserted. This volume difference allows gas on top of the slotted plate to be drawn down below the slots as the fins are reinserted.

This unwanted gas can accumulate under the slots if provision is not made for its venting. It is difficult for the gas to vent in the narrow gap between the fin 17 and the walls of slots 20A in the slotted plate 20. In FIGS. 4 and 5 two routes for gas venting are shown. Gas vent slot 54 is orthogonal to the fin slots and is typically 2 to 5 mm wide. Any gas below the slotted plate can vent up through this larger slot. Additionally, the diameter of the central hole 18 which accommodates connecting rod 21 is larger than the connecting rod so it can also vent gas.

Adjacent fins below the slotted plate, and the bottom of the slots form a series of potentially isolated gas pockets. Each of these gas pockets needs to be vented, that is why gas vent 54 and central hole 18 break into every potential gas pocket.

As some gas can be below the slotted plate assembly there may be turbulent gas/liquid mixing when operating at speed circa 25 Hz, but the slotted plate assembly will contain this turbulence. At higher speeds increased volumes of liquid 17 are returned to lower chamber 45 via a passage 22. A small head difference is required to move the liquid through passage 22. At the inlet to the passage 22 the head is set by the level of the level control port 42. Inside lower chamber 45, there will be some small volume of gas this will lower the effective head in lower chamber 45. This small head difference of possibly only a few millimetres will drive the returning liquid through passage 22.

In FIGS. 1, 2 and 3 the passage 22 is the gap between the cylindrical wall 58 of the slotted plate assembly and the inner wall of the main cylinder 30. In FIGS. 4 and 5 it is small duct between the channel 59 at least partially around the slotted plate 20 between apertures 60 at the bottom of the cylindrical wall 58.

By design, passage 22 provides a limited amount of friction and liquid flow inertia. This is required because as the fins are inserted into the liquid in lower chamber 45, the liquid friction between the fins and liquid pushes the liquid downwards in lower chamber 45 and then up into passage 22. Conversely as the fins are withdrawn from the liquid the liquid friction pulls the liquid back into lower chamber 45 and down in passage 22. This liquid friction effect could potentially cause liquid sloshing in passage 22 and the liquid level 19 at control port 42 would not be stable. The flow resistance and liquid inertia of passage 22 needs to be designed to prevent any significant liquid sloshing while at the same time not so much flow resistance that it prevents the easy return of the liquid. It should also be noted that the surface area of channel 59 between the slotted plate assembly 46 and main cylinder 30 is much greater than the area of passage 22, so the amplitude of the small amount of sloshing that does occur in passage 22 is reduced at the control port 42.

It is important that the system design keeps the liquid level 19 just below the top of slotted plate 20. Once liquid gets permanently on top of the slotted plate 20, gas liquid instability and mixing in the upper chamber 43 may occur. This liquid gas mixture can then be transferred through port 15 which is very undesirable.

The support fins 23 below the slotted plate 20 are used to guide and support the fins 17. They are particularly useful when the fins are flat. If the fins 17 are curved, the support fins 23 can be omitted as the fins 17 will be structurally stiffer.

There should be plenty of clearance between the support fins 23 and the compensator 34 so hydraulic liquid can flow easily between them as the compensator is moved up and down. The support fins are stepped 55 so that the central aperture, in which the compensator moves, between the fins is of greater diameter further below the slotted plate 20. This can be seen in FIG. 5 where a passage 55A is created to allow liquid to move freely.

Compensator piston 34 and the support fins 23 allow liquid to flow around the compensator, but as the main piston approaches its top dead centre and the compensator approaches the slots, its velocity is also approaching zero. As the flow rate between the compensator 34 and support fins 23 reduces, the space between the support fins 23 and compensator 34 can be reduced closer to the slots. This allows the support fins 23 immediately below the slotted plate 20 to increase the strength of the slotted plate 20.

It can be seen that the upper chamber 43 and the lower chamber 45 remain linked by the gas vent 54 and, hydraulically, by the slots 20A and the passage 22.

FIG. 6 is a vertical section view through a near isothermal Stirling heat pump comprising a near isothermal compressors and expanders according to the invention. Pinion 50 is driven by an electric motor, which drives a Ross Yoke linkage 51 which is then connected to connecting rods 52, which in turn drive the two pistons 16 of a near isothermal compressors and expanders with a phase angle of about 120° between them.

The output ports 15 of the two main cylinders are connected via regenerative heat exchanger 64.

The near isothermal Stirling heat pump is contained in a pressurised container 37. The internal gas could be compressed air or preferably a gas with high thermal conductivity such as helium or hydrogen.

One of the external flow ports is labelled 27 in FIG. 6 but there would be four ports, two output ports (hot and cold flow) and two return ports. The other ports are not shown in this section.

FIG. 7 shows a detailed section view of a possible alternative external flow circulation system which may be used. The inlet check valve 32 is a reed valve. When compensator 34 moves upwards check valve 32 opens and allows flow into chamber 31. When the compensator 34 moves downwards the liquid in openings 24 mixes with the liquid in the chamber 31 so providing the heat transfer. The liquid then is pumped through chambers 61 and duct 53 and then out via reed check valve 26.

Most of the heat transfer occurs due to the mixing of liquids in chamber 31 but main cylinder bottom has a plug 57 made from a thin wall metallic material such as aluminium, this provides an additional thermally conductive heat transfer path between the liquids in chambers 45 and 61. While this heat transfer is not significant it does provide some benefit at little extra cost.

Figure 8:
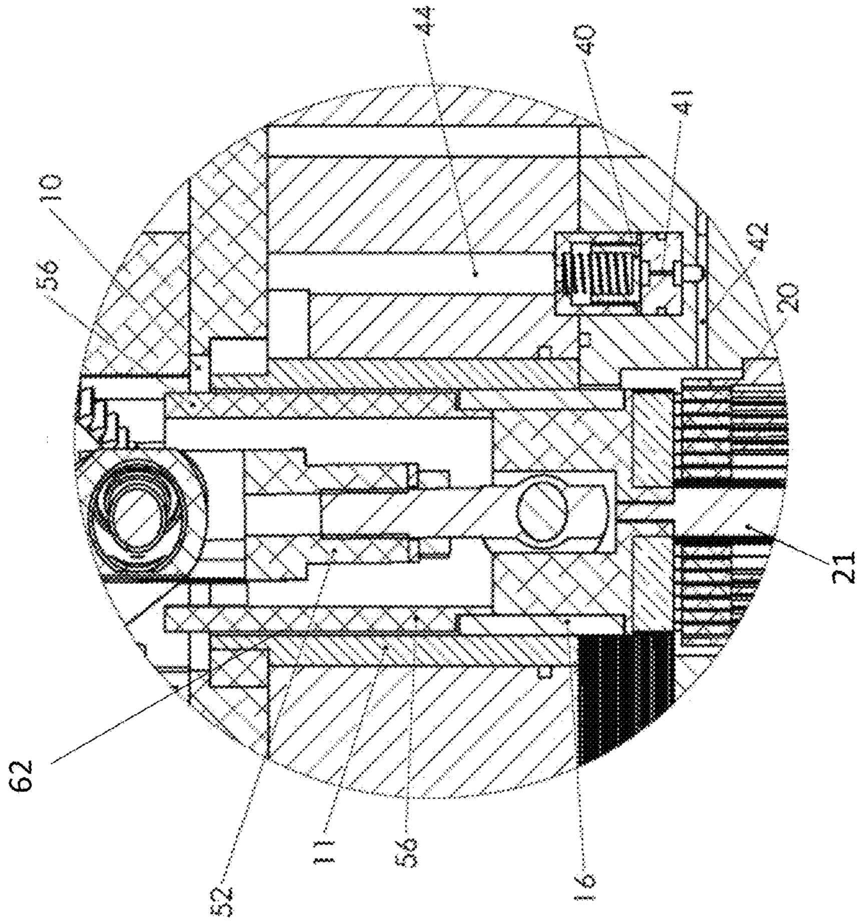
FIG. 8 shows the level control and piston liquid lubrication system of the near isothermal Sterling heat pump of FIG. 6.

FIG. 8 shows the level control and piston liquid lubrication system. The level control is as previously described using level control port 42, flow restrictor 41 and check valve 40. The ejected liquid from the level control system is fed via passage 44 into piston wetting pool 10. Passage 44 will always retain some liquid to keep the seat of the check valve 40 wet, even when gas is being ejected via level control port 42.

Figure 9:
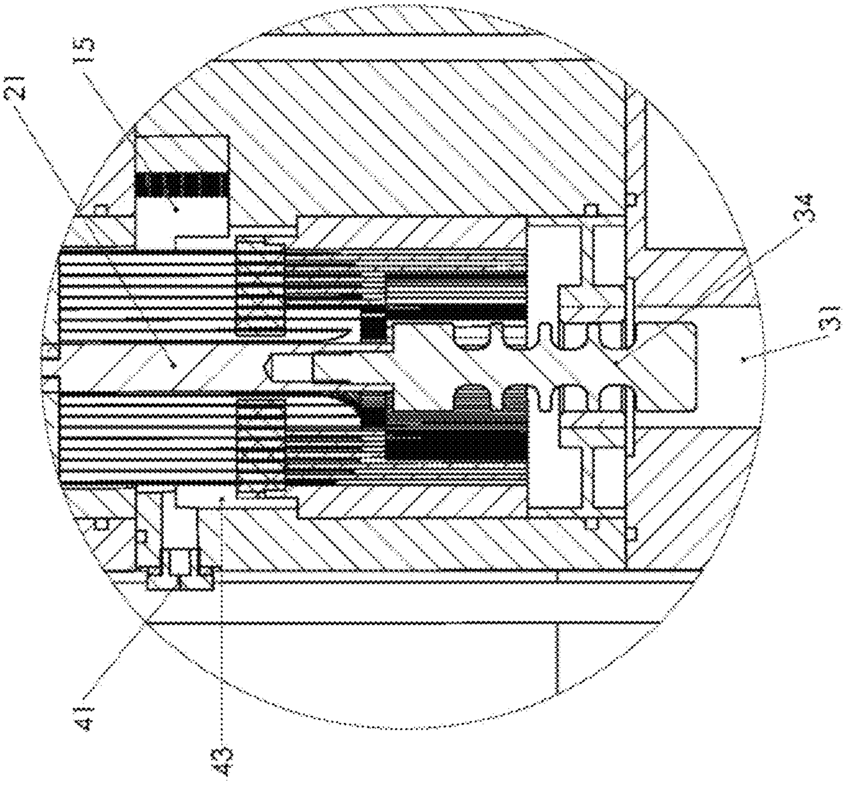
FIG. 9 shows the gas leakage restrictor of the near isothermal Sterling heat pump of FIG. 6.

FIG. 9 shows the gas leakage restrictor 41. In this case only one of the main cylinder pair has a gas leak restrictor 41. This near isothermal Stirling heat pump does not use a check valve 14 as shown in FIG. 1 so small quantities of gas can leak in and out, this is the preferred arrangement for a near isothermal Stirling heat pump.

Figure 11:
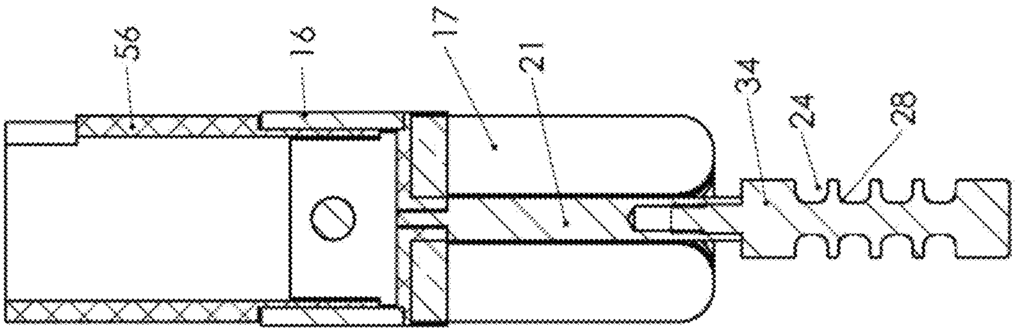
FIG. 11 is a vertical section of the alternative piston with its associated heat absorbing and releasing structure shown in FIG. 10.
Figure 10:
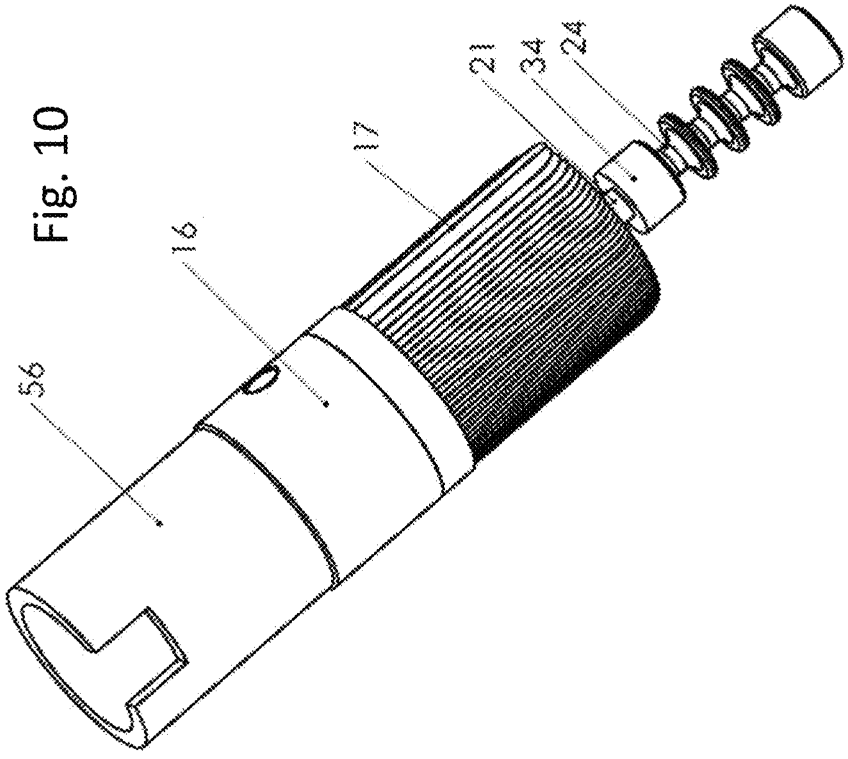
FIG. 10 is a perspective view of an alternative piston with its associated heat absorbing and releasing structure to that shown in FIGS. 1, 2 and 3, particularly for use in the near isothermal Sterling heat pump of FIG. 6.

In FIG. 1, the piston 16 is longer than its bush or seal 11. In FIGS. 6 and 8, it is the other way around, there is a relatively long main cylindrical bush or seal 11 which forms a gas seal with the relatively short piston 16 yet allows the piston 16 to reciprocate within the main cylinder 30. The advantage of a short piston and long bush or seal 11 is that it reduces the weight of the moving parts, which can be advantageous. This arrangement is shown in more detail in FIGS. 10 and 11.

A liquid retainer 56 moves up and down with the piston. It is made of plastic or some other lightweight material. There is a small annular gap 62 (seen in FIG. 8) between the liquid retainer 56 and the bush or seal 11. This annular gap between the liquid retainer 56 and bush or seal 11 can fill with liquid. The liquid provides lubrication and helps reduce gas leakage between the piston 16 and bush or seal 11.

In the forgoing description, the same liquid is used throughout the machine. In another example a gas is used in the compensator chamber, but in that case the openings 24 would be omitted and the bush or seal 25 provide a gas tight seal against the compensator 31. In this design, the liquid flow arrangements would be altered so that replenishment of lost liquid was direct into the lower chamber 45 and not via the compensator chamber 31.

The invention claimed is:

1. A machine for compressing or expanding gas which comprises: a piston; a vertical main cylinder or main cylinder inclined to the vertical; a bush or seal inside the main cylinder through which the piston moves; a heat absorbing and releasing structure comprising a plurality of fins attached to and disposed orthogonally to a bottom of the piston; in which the piston moves downwards in a compression stroke with respect to the main cylinder and upwards with respect to the main cylinder in an expansion stroke, the main cylinder containing a substantially constant volume of liquid maintained at a substantially constant temperature and a variable volume of gas and in which the gas temperature is controlled to substantially the same temperature as the liquid by the movement with the piston of the heat absorbing and releasing structure between the variable gas volume and the liquid; wherein a connector rod is orthogonally attached to the base of the piston and to a compensator in a compensator chamber mounted below the main cylinder, the compensator oscillating, in use, upwards into the main cylinder and downwards into the compensator chamber, the volume of the compensator entering the main cylinder on an upward movement at least partially compensating for the drop in liquid level in the main cylinder on an upward movement of the heat absorbing and releasing structure and the volume of the compensator leaving the main cylinder on a downward movement at least partially compensating for liquid level gain in the main cylinder on downward movement of the heat absorbing and releasing structure.

2. A machine for compressing or expanding gas as claimed in claim 1 comprising a further bush or seal between the main cylinder and the compensating chamber, the further bush or seal comprises an aperture through which the compensator passes.

3. A machine for compressing or expanding gas as claimed in claim 1 wherein the compensator comprises openings formed between separators, said openings to transport liquid from the compensator chamber to the main cylinder during upward movement of the compensator, or from the main cylinder to the compensator chamber during downward movement of the compensator, there being at least one or more of the separators being aligned with the bush or seal throughout movement of the compensator.

4. A machine for compressing or expanding gas as claimed in claim 3 wherein the separators comprise cylindrical lands around their periphery, said lands being co-axial with the compensator.

5. A machine for compressing or expanding gas as claimed in claim 3 wherein the openings are in the form of pockets.

6. A machine for compressing or expanding gas as claimed in claim 3 wherein the openings are in the form of slots passing through the compensator.

7. A machine for compressing or expanding gas as claimed in claim 1 wherein the compensator chamber comprises an inlet valve and an outlet valve, liquid being drawn into the compensator chamber during upward movement of the compensator and excess liquid being expelled from the compensator chamber during downward movement of the compensator.

8. A machine for compressing or expanding gas as claimed in claim 1 wherein the main cylinder is divided into an upper chamber and a lower chamber by a slotted plate, the slotted plate comprising slots therein through which the fins pass.

9. A machine for compressing or expanding gas as claimed in claim 8 comprising a gas vent from the lower chamber to the upper chamber.

10. A machine for compressing or expanding gas as claimed in claim 9 wherein the gas vent is in the slotted plate.

11. A machine for compressing or expanding gas as claimed in claim 8 wherein the slotted plate is mounted in a slotted plate assembly, said slotted plate assembly comprising a cylindrical wall facing the inner wall of the main cylinder.

12. A machine for compressing or expanding gas as claimed in claim 8 comprising a channel at least partially around the slotted plate.

13. A machine for compressing or expanding gas as claimed in claim 12 comprising a passage extending from the channel to the lower chamber.

14. A machine for compressing or expanding gas as claimed in claim 8 comprising a port in the main cylinder just below the top of the slotted plate, said port allowing liquid in the main cylinder above the port to leave the main cylinder.

15. A machine for compressing or expanding gas as claimed in claim 14 comprising a check valve connected to the port.

16. A machine for compressing or expanding gas as claimed in claim 14 comprising a wetting pool on top of the bush or seal and a passage for liquid between the port and a passage for liquid between the port and the wetting pool.

17. A machine for compressing or expanding gas as claimed in claim 1 wherein the piston comprises a cylindrical liner attached thereto with an annular gap between the cylindrical liner and the bush or seal.

18. A machine for compressing or expanding gas as claimed in claim 1 which is one of two such machines mounted together and forming a heat pump.

19. A machine for compressing or expanding gas which comprises: a piston; a vertical main cylinder or main cylinder inclined to the vertical; a bush or seal inside the main cylinder through which the piston moves; a heat absorbing and releasing structure attached to a bottom of the piston; in which the piston moves downwards in a compression stroke with respect to the main cylinder and upwards with respect to the main cylinder in an expansion stroke, the main cylinder containing a substantially constant volume of liquid maintained at a substantially constant temperature and a variable volume of gas and in which the gas temperature is controlled to substantially the same temperature as the liquid by the movement with the piston of the heat absorbing and releasing structure between the variable gas volume and the liquid; wherein a connector rod is orthogonally attached to the base of the piston and to a compensator in a compensator chamber mounted below the main cylinder, the compensator oscillating, in use, upwards into the main cylinder and downwards into the compensator chamber, the volume of the compensator entering the main cylinder on an upward movement at least partially compensating for the drop in liquid level in the main cylinder on an upward movement of the heat absorbing and releasing structure and the volume of the compensator leaving the main cylinder on a downward movement at least partially compensating for liquid level gain in the main cylinder on downward movement of the heat absorbing and releasing structure, the machine comprises a further bush or seal between the main cylinder and the compensating chamber, the further bush or seal comprises an aperture through which the compensator passes, wherein the compensator chamber contains the same liquid, and the compensator comprises openings formed between separators, said openings to transport liquid from the compensator chamber to the main cylinder during upward movement of the compensator, or from the main cylinder to the compensator chamber during downward movement of the compensator, there being at least one or more of the separators being aligned with the bush or seal throughout movement of the compensator.

* * * * *